Nov. 19, 1940.  S. BERMAN  2,221,773
RECTIFIER
Filed June 20, 1938  2 Sheets-Sheet 1
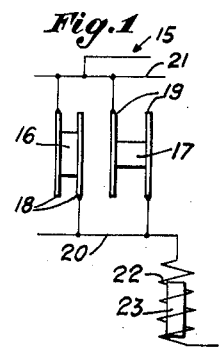
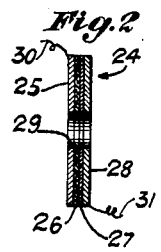
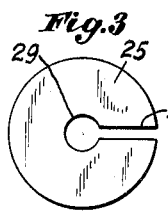
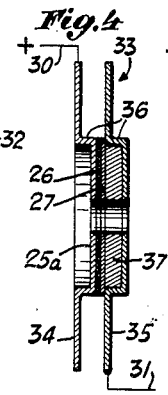
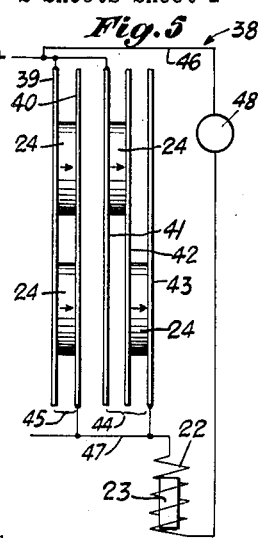
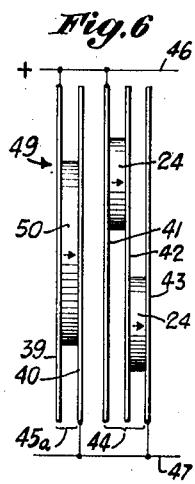
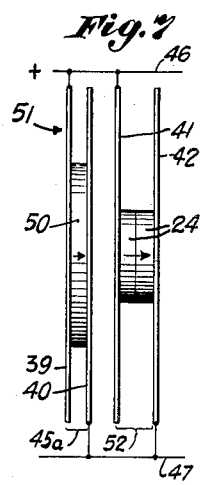
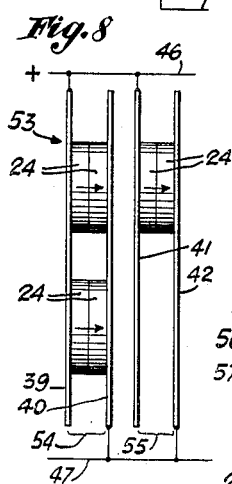
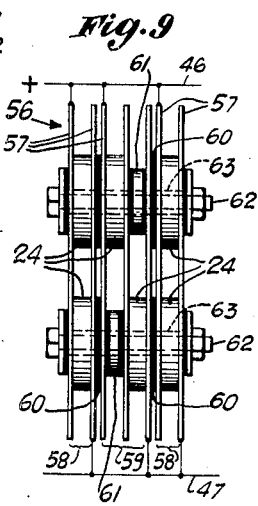
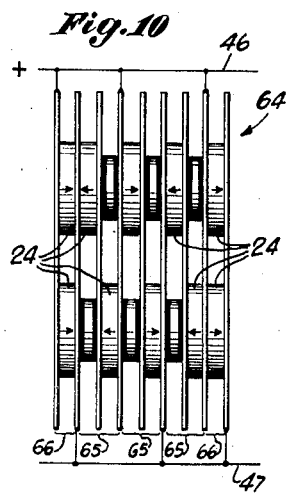
Samuel Berman INVENTOR.
BY Thos Shumacher ATTORNEY.

Nov. 19, 1940.   S. BERMAN   2,221,773
RECTIFIER
Filed June 20, 1938    2 Sheets-Sheet 2

Samuel Berman INVENTOR.
BY  ATTORNEY.

Patented Nov. 19, 1940

2,221,773

UNITED STATES PATENT OFFICE 2,221,773

RECTIFIER

Samuel Berman, Bayonne, N. J., assignor of twenty-five per cent to Aaron A. Melniker Application June 20, 1938, Serial No. 214,711

4 Claims. (Cl. 175—363)

This invention relates to alternating current rectifier devices of the dry, as distinguished from the chemical type.

Heretofore it has been known to provide such rectifiers having plates oxidized at one face to afford a high resistance against a current entering the plate at the oxidized face thereof. These rectifiers had various drawbacks the chief of which was the generation of heat tending to break down the oxide. Hence a great many plates had to be used to distribute the current or the potential drop, with the result that these rectifiers were expensive and bulky.

The present invention has for its main object the provision of an improved rectifier device or system of this general type which shall create substantially less heat and thus permit the passage therethrough of a relatively large amount of current while permitting the rectifier to be relatively small and compact.

According to the invention, an improved rectifier is associated with an inductance to provide the rectifier system or device which affords the advantages herein stated, and in accordance with the principles of the invention.

Generally stated, the invention provides an improved alternating current rectifier system, according to which a plurality of rectifier units are connected in parallel to an inductance member, the rectifier units having condenser characteristics or having condensers operatively associated therewith, and one of the rectifier units having a substantially higher resistance than the other to utilize the self induction of the inductance member to thus reduce the loss of power as by the generation of heat. Accordingly the invention may embrace any kind of rectifier unit whether of the well known liquid or solid type and whether operative by chemical action or otherwise. By a rectifier unit having a condenser characteristic is meant particularly one having a metallic contact plate one surface of which is oxidized, as disclosed in Patent No. 1,640,335, issued August 23rd, 1927. I have reason to believe that the rectifier elements or sections described in this patent really constitute condensers, with the oxide acting as a dielectric, among its other possible functions. However, heat radiating fins or plates associated with these rectifier sections constitute according to my invention, enlarged condensers which increase substantially the efficiency of my rectifier system. In any case, as a result of the parallel connection of units of substantially different resistances, a change in phase is introduced such that the self induction at the unit of higher resistance counteracts the inverse current to an unusual degree so as to relieve the units of a substantial portion of the rectifying load.

It is accordingly an object of the invention to provide improved means for realizing the objects and advantages and avoiding the drawbacks noted.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a schematic view of a device or system embodying the invention.

Fig. 2 is a sectional view of a unidirectional current carrying section.

Fig. 3 is a view in side elevation of the same.

Fig. 4 is a sectional view of a modification thereof.

Fig. 5 is a diagrammatic view of a device embodying the invention.

Figs. 6, 7, 8, 9 and 10 are similar views of modifications but with the inductance member omitted.

Figure 11:
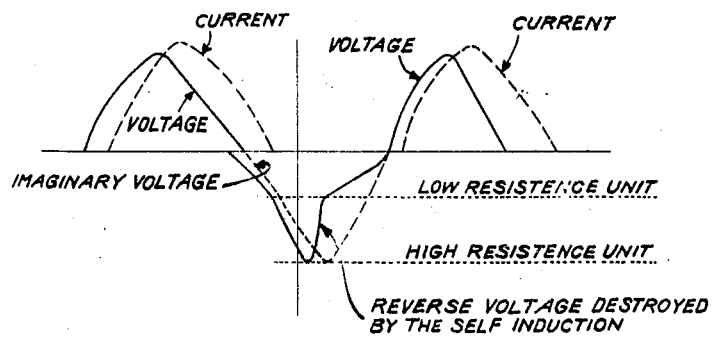
Fig. 11 is a curve of the current and voltage in my device, according to an oscillogram thereof.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 15 denotes a rectifier device or system embodying the invention. The same may include a plurality of rectifier 16, 17 having condenser characteristics or having individual condensers 18, 19, which may represent complete condensers or parts thereof connected, associated with, or forming parts of said units so as to be charged by the current that flows in said units. The latter may be connected in parallel relation to each other by a circuit 20, 21 which leads to an inductance member 22, that may be in the nature of an induction coil or solenoid for operating the plunger 23 of an electrical hammer. It will be understood that the inductance member may be used for any other purpose or associated with any other apparatus for the performance of useful work, within the knowledge of those skilled in the art.

The essential feature of the device 15, is that in the environment described, the units 16, 17 have substantially different resistances. Thus the unit 17 schematically represents a substantially higher resistance than the unit 16. The resistance referred to is one inherent in a rectifier which is of such character that it rectifies an alternating current by reason of having a much greater resistance in one direction than in the other.

In the device 15 I have found that the self induction of the inductance member 22 in coordination with the resistance relationship mentioned serves to bring about a rectification of an alternating current with the loss of much less power than has heretofore been possible. The theory of operation will be described more fully in connection with certain specific metallic rectifiers to which I shall now refer.

In Fig. 2 is shown a rectifier section 24 comprising a metallic plate 25 having an oxidized surface portion 26 against which is disposed a contact plate 27 of bismuth, lead or other soft metal backed by a relatively hard metallic plate 28. The plates 25 and 28 may consist of copper or iron or the like, in which case the oxide 27 would be copper oxide or iron oxide and the like. This section 24 is under powerful axial pressure to assure tight surface contact of the plates, any suitable insulated bolts and washers, not shown, being used, and with the bolt preferably extending through the axial holes 29 of the plates, as described in Patent No. 1,640,335, hereinbefore referred to. The section 24 may be connected into a circuit at 30, 31 so that the current will flow from 30 to 31 but not in the reverse direction. The section 24 thus constitutes a unidirectional current carrying device or a rectifier section having asymmetrically conducting contact surfaces.

According to Fig. 3, the plate 25 having the oxidized surfaces 26 may be radially slotted as at 32 to reduced magnetic eddy effects that might be generated.

In Fig. 4 is shown a modification wherein a rectifier section 33 includes air cooling fins or condenser portions forming an integral part of the rectifier section such as 24. For example, a plurality of metal plates 34, 35 have their outer circular sections spaced and free to form air cooling fins and to cooperate to provide a condenser. The central regions of these plates may be offset as at 36, the offset at the plate 34 designated 25a corresponding to the plate 25 and having an oxidized face 26 contacting the soft metal plate 27 that is backed by a metallic filler 37 that is received in the recess of the plate 35 and is in contact therewith. If desired, the offsets 36 may be omitted, and the whole or only the central region of the plate 34 may be oxidized at one side. In lieu of the integral construction at plates 34, 35, a section such as 24 may be disposed directly between a pair of metal plates as suggested in the other figures to provide the cooling and condenser means. The operation of the rectifier sections 24 and 33 may thus be exactly alike, and the plate 34 may be slotted as at 32.

In Fig. 5 is shown a rectifier device or system 38 embodying the invention. The same may include a plurality of rectifier sections diagrammatically shown at 24. A plurality of these sections may be placed between a pair of plates 39, 40 in contact therewith. The sections 24 are thus in parallel with each other, the plates forming a part of the circuit, and the direction of current flow being indicated by the arrows. Another section 24 is disposed between a pair of plates 41, 42, and a fourth section 24 is disposed between a pair of plates 42, 43, in contact therewith, the plates desirably forming a part of the circuit, and the direction of flow of the current being indicated by the arrows. It will thus be seen that the second pair of sections 24 are in series relation to each other. Accordingly there is thus provided a rectifier unit 44 having approximately double the resistance of the unit 45.

These units 44, 45 are connected in parallel in a circuit 46, 47 which includes an inductance 22. A source of A. C. current is indicated at 48.

According to the device 38 the self induction of the inductance member 22 serves to greatly increase the efficiency of the rectifier sections 24, so that the generation of heat is kept at a minimum, as a consequence of which only $\frac{1}{10}$ or $\frac{1}{15}$ as many units 24 need be used for rectification of a given quantity of current, as heretofore required.

By reference to the modifications of Figs. 6 to 8 a clearer understanding of the inventive principle will be obtained. In Fig. 6 is shown a device 49 embodying the invention according to which the unit 45a differs from the unit 45 mainly in that a single rectifier section 50 having double the area of a section 24 is used to replace two of the latter. Otherwise the structure is the same.

In Fig. 7 is shown a device 51 which is like the device 49 except that the unit 52 is different from that at 44 in having a pair of sections 24 in direct alined contact with each other for the series relationship. It will be perceived that if the layer of oxide 26 can be increased in thickness or character to increase its resistance for unidirectional current control, only one rectifier section 24 might be used in the unit 52. But it would not be advisable to attempt to increase the resistance by unduly reducing the area of the section 24, because the heat generated might become excessive and affect the stability of the oxide.

In Fig. 8 is shown a device 53 embodying the invention which differs from the device 51 mainly in that each unit 54, 55 includes sections 24 in alined direct contact with each other to thus affect the relative resistances of the units. This arrangement also affords some structural advantages for mounting on bolts as shown in Fig. 9 hereinafter described.

It will be understood that the circuits for all of the devices 38, 49, 51 and 53 are alike, and that all the sections 24 may be considered as having the same area.

It will now be perceived that the invention involves the use of rectifiers in parallel connection with an inductance member, where the resistance of one rectifier unit is substantially greater than that of the other, this principle being broadly exemplified by the schematic showing in Fig. 1. The rectifier unit having the high resistance should have a resistance that is insufficient to cause excessive loss of power nor such generation of heat as will cause deterioration, for instance, of the metallic oxide 26. In that sense the high resistance rectifier unit may be regarded as a standard for comparison with the low resistance rectifier unit. When referring to a standard high resistance rectifier unit, it will be borne in mind that the same may consist of many different sections 24 as shown, for example, in Fig. 10, hereinafter described, so that the resistance may vary according to the number of high resistance sections that are connected in parallel, but it is believed that with the heat generation as a guide, the standard of comparison will be evident to those skilled in the art. The low resistance rectifier unit may have only one-half or one-fourth the resistance of the high resistance rectifier unit, but here again, the circuit used introduces variables so that it is inadvisable to specify more than that the resistance of the high resistance unit or section such as 17 shall be substantially greater than that of the low resistance unit or section such as 16. While mention has been made of the heat generated in the high resistance rectifier unit, it is desirable to point out that for some reason the low resistance rectifier unit appears to have a somewhat higher temperature than the high resistance unit, in certain designs of the invention.

The theory of operation of my invention appears to involve the thought that a basic rectifier section such as 24, whose action has not been understood heretofore, actually constitutes a condenser, of which the oxide layer 26 is the dielectric. In other words, then, the plates such as 25, and 27 or 28 form the plates of a condenser. This is directly related to the fact that while the oxide has a low resistance in one direction, it affords a high resistance in the opposite direction, whereby the condenser receives at least a momentary charge, however small. By the use of large plates such as 39 to 43, the condenser capacity is greatly increased. At any rate, these plates 39 to 43 may be regarded as acquiring a static charge, similar to that of a condenser. An important aid for the function of the rectifier is supplied by the induction coil according to the following theory.

When the alternating current reverses its direction, self induction of the solenoid or inductance member occurs with the result that the condensers or plates thereof become so charged as to oppose the reversely flowing current, thus aiding the rectifier action and relieving the same of load, so that the generated heat is greatly reduced. The high resistance rectifier unit such as 44 produces a time lag so that the charge caused by self induction (the voltage surging ahead of the current), meets and opposes the voltage peak of the reverse flow of current (see Fig. 11); by way of suggestion the voltage peak may include a potential from 60 to 120 volts on a 120 volt circuit. Because of the lower resistance of the low resistance unit such as 45 or 45a, the latter including its condenser plates may function in a somewhat similar manner to counteract the lower voltage region of the reverse current wave, say from 0 to 60 volts, (see Fig. 11). It may, therefore, follow that condenser or other plates such as 39, 40 may not be absolutely necessary for the low resistance unit, such as 45 or 45a, although the best results may be obtained by using them, since it will be remembered that these plates serve an important purpose as heat dissipating fins. Apparently it is the action above described which has permitted me to increase the current carrying capacity of the sections 24 to such a degree that only one-tenth to one-twelfth as many such sections need to be used as heretofore, without creating a temperature that would cause deterioration of the metallic oxide.

The foregoing mode of operation is aided by the heat conductor plates with the copper oxide faces serving in a manner similar to a dielectric to afford an action analogous to that of a condenser.

In Fig. 9 is shown a modified device 56 embodying the invention and showing the sections 24 arranged between condenser plates 57 to provide parallel or low resistance units 58 and a series or high resistance unit 59. These units are insulated from each other as at 60. Due to the staggered arrangement of the sections 24 of the unit 59, spacers or washers 61 are employed whose opposite faces are insulated as shown. Bolts 62 having insulator sleeves 63 extend through openings such as 29 and exert compression on the sections 24, said bolts being insulated throughout. It will be recognized that the device 56 is in general similar to that shown at 38 except that I prefer to use two low resistance units 58 with one high resistance unit 59.

In Fig. 10 is shown a device 64 embodying the invention and being generally similar to that shown at 56 except that three high resistance units 65 are used with two low resistance units 66. The unidirectional current flow is indicated by the arrows. Various other arrangements and combinations can be readily devised including those shown in Patent No. 1,640,335.

It will be noted that the staggered arrangement of the series units greatly increases the heat radiating area.

Figure 12:
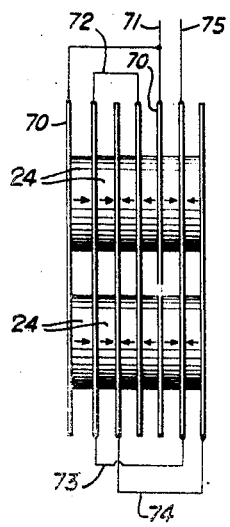
Figs. 12 and 13 are views showing other modifications of the circuit.

In Fig. 12 is shown a modified form of the invention, with conductor plates 70 connected to a source of current as at 71; certain other conductor plates interconnected in a staggered manner at 72, 73 and 74, and a return connection being provided at 75; the current flowing through the units 24 as indicated by the arrows. No insulation is required between the units 24 and the plates.

Figure 13:
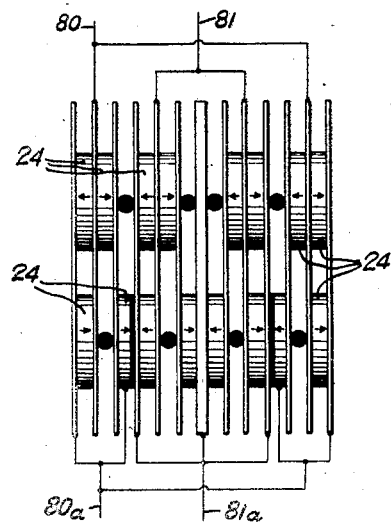

In Fig. 13 is shown a device for utilizing both waves of an alternating current, the lead-ins being at 80, 81 which are alternately positive and negative, and the circuit being completed at 80a, 81a. The current flows in the direction of the arrows with the mode of operation being in general similar to that of the full wave rectifier of Patent No. 1,640,335 hereinbefore mentioned. An inductance is used for charging batteries, as in said patent.

In each of the embodiments herein shown, I prefer to use alternate condenser plates of high and low resistance. For example, in Fig. 10, the first and other odd plates may be of copper and the second and other even plates may be of tin or other high resistence metal to reduce eddy currents, the copper being used because it has better heat conductivitiy and hence forms a better heat dissipating fin.

My invention will operate at voltages up to 110 and over independently of the number of plates used.

My invention also contemplates a new rectifier plate and method of producing the same, said rectifier plate being capable of withstanding much higher temperatures than an oxidized metal plate. I mix aluminum powder with an alkaline solution, about half and half by weight, by analogy with certain well known liquid rectifiers. To this alkaline solution is added a dryer, to cause the same to harden. Before hardening, the mixture is sprayed on a steel plate upon which the mixture is caused to harden to produce the rectifier plate as a substitute for the elements 25, 26, for a like use and functioning.

I claim:

1. A device including an alternating current rectifier system having units each of which comprises a plate characterized by asymmetrically conducting surfaces, one of said units having a substantially higher asymmetric resistance than the other unit, a circuit connecting said units in operative parallel relation with each other, and an inductance member connected to said circuit and cooperative with said units, whereby the unit of higher resistance causes a self induction current substantially opposite in phase to a phase of the alternating current to substantially counteract the same for reducing the rectification load on said plates, the plates consisting of copper each having a copper face and an opposite copper oxide face, and heat conducting plates of substantially larger area than the copper plates disposed at the sides of the copper plates and in contact therewith and cooperating therewith to provide an action analogous to that of a condenser when said device is connected to an inductance member.

2. A device including an alternating current rectifier system having units each of which comprises a plate characterized by asymmetrically conducting surfaces, spacer elements, said units and spacer elements being arranged in rows, plates for conducting heat and electrical current intersecting said rows so that each of said units and spacer elements lies between a pair of the plates, according to an arrangement such that a pair of plates has a unit in one row therebetween and a spacer element in the other row between the plates, said spacer elements being electrically insulated from said plates, and tensioning elements extending through said spacer elements and units and plates, said plates being otherwise spaced from each other for free air circulation therebetween.

3. A device including an alternating current rectifier system having units each of which comprises a plate characterized by asymmetrically conducting surfaces, one of said units having a substantially higher asymmetric resistance than the other unit, a circuit connecting said units in operative parallel relation with each other, and an inductance member connected to said circuit and cooperative with said units, spacer elements, said units and spacer elements being arranged in rows, plates for conducting heat and electrical current, said plates intersecting said rows so that each of said units and spacer elements lies between a pair of the plates, according to an arrangement such that a pair of plates has a unit in one row therebetween and a spacer element in the other row between the plates, said spacer elements being electrically insulated from said plates, and tensioning elements extending through said spacer elements and units and plates, said plates being otherwise spaced from each other for free air circulation therebetween.

4. A device including an alternating current rectifier system having units each of which comprises a plate characterized by asymmetrically conducting surfaces, one of said units having a substantially higher asymmetric resistance than the other unit, a circuit connecting said units in operative parallel relation with each other, and an inductance member connected to said circuit and cooperative with said units, spacer elements, said units and spacer elements being arranged in rows, plates for conducting heat and electrical current, said plates intersecting said rows so that each of said units and spacer elements lies between a pair of the plates, according to an arrangement such that a pair of plates has a unit in one row therebetween and a spacer element in the other row between the plates, said spacer elements being electrically insulated from said plates, and tensioning elements extending through said spacer elements and units and plates, said plates being otherwise spaced from each other for free air circulation therebetween, said units consisting of copper plates each having a copper oxide face, said conducting plates being of substantially larger area than the copper plates and lying at opposite faces thereof to provide with the copper plates an action analogous to that of a condenser adapted to discharge to aid the rectified current.

SAMUEL BERMAN.